(12) United States Patent
Xu

(10) Patent No.: US 8,714,599 B2
(45) Date of Patent: May 6, 2014

(54) SEALING MICROSAWTOOTH RING JOINT OF TWO OPPOSING SURFACES

(75) Inventor: Changxiang Xu, Wenzhou (CN)

(73) Assignee: Weber-Stephen Products, LLC, Palatine, IL (US)

( * ) Notice: Subject to any disclaimer, the term of this patent is extended or adjusted under 35 U.S.C. 154(b) by 293 days.

(21) Appl. No.: 13/142,445

(22) PCT Filed: Mar. 17, 2009

(86) PCT No.: PCT/CN2009/000281
§ 371 (c)(1),
(2), (4) Date: Jun. 28, 2011

(87) PCT Pub. No.: WO2010/075657
PCT Pub. Date: Jul. 8, 2010

(65) Prior Publication Data
US 2011/0266483 A1 Nov. 3, 2011

(30) Foreign Application Priority Data

Dec. 31, 2008 (CN) .......................... 2008 1 0189909

(51) Int. Cl.
*F16L 25/00* (2006.01)
(52) U.S. Cl.
USPC ............................. 285/328; 285/352; 285/412
(58) Field of Classification Search
USPC ........................ 285/336, 368, 352, 328, 412
See application file for complete search history.

(56) References Cited

U.S. PATENT DOCUMENTS

| 652,396 | A | * | 6/1900 | Lovekin | 285/328 |
|---|---|---|---|---|---|
| 757,376 | A | * | 4/1904 | Whitaker | 220/228 |
| 1,348,667 | A | * | 8/1920 | Snyder | 285/328 |
| 1,935,673 | A | * | 11/1933 | Smith et al. | 285/328 |
| 2,050,137 | A | * | 8/1936 | Walsh | 285/331 |
| 3,284,112 | A | * | 11/1966 | Martin | 285/328 |
| 3,403,717 | A | * | 10/1968 | Lemelson | 411/143 |
| 5,087,504 | A | * | 2/1992 | Kanai et al. | 428/167 |
| 2004/0164554 | A1 | * | 8/2004 | Cabezas | 285/405 |

* cited by examiner

*Primary Examiner* — Aaron Dunwoody
(74) *Attorney, Agent, or Firm* — Niro, Haller & Niro

(57) ABSTRACT

A sealing microsawtooth ring joint, made between a toothed seating surface and a full plain seated surface by a microsawtooth ring with its tooth crest on the seating surface being a cutting edge whose corner or whose crest angle is about 90°~120°, with its tooth height $Z_t$ being about 10~20 times the roughness $R_a$ of the seated surface, and with the ratio of its tooth pitch $X_s$ to its tooth height $Z_t$ being 20~500 to ensure that the tight joint has a microcosmic line contact followed by a surface contact or to ensure that the tight joint has both such a line contact as to be able to provide a necessary seating stress locally and such a surface contact as to be able to protect the line contact from being excessively pressed to get blunt or disappeared, can be used either as a pressure-tight joint or as a self-energizing tight joint of any two surfaces such as flats to flats, cones to cones or spheres, spheres to spheres or cones etc., thus simplifying and unifying the designing, calculating, manufacturing, selecting, installing and maintaining of fussy gaskets for a tight joint of flat surfaces, avoiding the lapping of formed jointing surfaces without using soft gaskets, increasing the reliability of tight joints and the utilizing coefficient of natural resources. The sealing microsawtooth ring joint can still have an extra sealing reliability and safety sensation by selectively adding one of four basic gland seals.

4 Claims, 3 Drawing Sheets

SEALING MICROSAWTOOTH RING JOINT OF TWO OPPOSING SURFACES

TECHNICAL FIELD OF THE INVENTION

The invention relates to a fixed tight joint (hereafter called a sealing joint) of two fixed opposing surfaces disposed at port ends or port shoulders of pressure vessels, pipes or tubes, or pipe or tube fittings to be jointed for holding or conveying fluid medium or power, and a movable tight joint (hereafter called a closing joint) between movable valving members and valve seat rings for blocking a fluid flow, particularly to a tight joint of any two opposing surfaces one of which has one or two microsawtooth rings and the other of which is fully plain to form a jointing microcosmic line contact followed by a surface contact protecting the line contact thereon from disappearing.

TECHNICAL BACKGROUND OF THE INVENTION

The conveying of fluid medium or power needs to joint a variety of pressure vessels including valves tight by using some pipes or tubes and some pipe or tube fittings to form an enclosed leak-free system. All the fixed tight joints within a pressure vessel and between pressure vessels and pipes or tubes need to be fastened tight, and all the movable tight joints between valving members or discs and valve seats need to be mounted tight; otherwise the controlled transfer of medium or power can not be realized. A fixed or movable tight joint can be made on two parallel flats or two tapered surfaces, on a conical surface to a cone or a sphere, or on a spherical surface to a sphere or a cone; for example, the fixed tight joint of pipe flanges and the movable tight joint of slab gate valves in ISO 14313 are made on two parallel flats, the fixed tight joint between tubes and tube fittings in ISO 8434-2 and the movable tight joint of wedge gate valves in ISO 15761 are made on two tapered surfaces, and the fixed tight joint between tubes and tube fittings in DIN 7601 and the movable tight joint of ball valves in ISO 17292 are made on a conical surface to a sphere. All the fixed tight joints are fastened to be leak free in service, and all the movable tight joints are mounted to be leak free only in stationary closing service and to be movable or not to be leak free for shut-off operations and in stationary open service; i.e. both the fixed tight joint and the movable tight joint are not movable when working as a tight joint, or both are of a static tight joint, and hence the former is especially called a (static) sealing joint or and the latter, a (static) closing joint.

Any machined metallic surface is microscopically of such irregularities that any tight joint can not be made directly on the originally machined metallic surface, and hence any tight joint in the prior art is made either by seating a soft material into or by lapping to eliminate the irregularities on the two jointing machined surfaces.

The tight joint made by a soft nonmetallic material, in addition to bearing some new leaking microchannels in the material bulk, bears many troubles such as relaxation or creep, chemical stability or compatibility, contradiction of sealing ability with jointing strength (because the softer the seating material, the stronger the sealing ability but the weaker the jointing strength and vise verse), thermal stability, etc. caused by seating materials, and hence there exist such a great variety of gaskets of ASME B16.5 Annex C and EN 1514-1~-8, such a complicated gasket-designing/calculating method of EN 1591, and such complicated gaskets of patents U.S. Pat. No. 6,092,811, U.S. Pat. No. 6,869,081 and U.S. Pat. No. 7,255,353 that it is difficult for an engineer to correctly select a trivial gasket.

Some ring gaskets in ISO 10423 are used for making a sealing joint of two metal to metal machined flange faces, but only disposable. Some metal to metal valve seats in Patents U.S. Pat. No. 4,940,208, U.S. Pat. No. 4,502,663, U.S. Pat. No. 4,262,688, U.S. Pat. No. 4,235,418 and U.S. Pat. No. 4,147,327 were to be used for making a closing joint of two sphere to sphere or cone surfaces, but so far no actual products have been found. A V-toothed gasket in EN 1514-6 and an arc-ridged gasket in Patent application WO 94/29620 are used for making a sealing joint of two metal to metal machined flange faces, but the V-teeth and the arc ridges are macroscopic and shall be covered with soft material to avoid metal to metal contacts.

Obviously, what a simple job it is to design, manufacture, assemble and maintain a tight joint provided directly by two commonly machined surfaces but not by gaskets or lapped surfaces!

SUMMARY OF THE INVENTION

The object of the invention is to simplify and unify a variety of tight joints of two opposing surfaces, such as flats to flats, conical surfaces to cones or spheres, spherical surfaces to spheres or cores, etc., to avoid both the designing, calculating, manufacturing, selecting, installing and maintaining of fussy gaskets for a tight joint of flat surfaces and the lapping of formed jointing surfaces without using soft gaskets, thus increasing the reliability of tight joints and the utilizing coefficient of natural resources.

The geometric errors of a machined surface consist of roughness, waviness and form error. The roughness is of the finer microsurface irregularities left by cutting edges; their profile element width ($X_s$) is narrower, and, to their profile element height ($Z_t$), is less than 50 ($X_s/Z_t<50$). The waviness is of the fine microsurface irregularities caused by vibrations during machining; their profile element width ($X_s$) is narrow, and, to their profile element height ($Z_t$), ranges from 50 to 1000 ($X_s/Z_t=50\sim1000$). The form error is of the wide macrosurface irregularities caused by perpendicular and parallel errors between machine tool ways, spindles and alignment of the workpiece; their profile element width ($X_s$) is wide, and, to their profile element height ($Z_t$), is more than 1000 ($X_s/Z_t>1000$). The joint surfaces to be seated are commonly finished by turning or boring operations, which are of a finely machining method and can use an economic high spindle speed resulting in a high frequency vibration and a narrow width of waviness, and use an economic fine feed speed resulting in a fine cut mark and a narrower width of roughness. The form error caused by the clamping or aligning of the woodpiece shall and can also be reduced to the ignored extent, whereas the form error caused by machine tool ways and spindles can be of a wave whose cycle or profile element width is too great to be considered within a narrow seating surface; for example, the perpendicularity of transverse guide way and spindle of a lathe at most causes a facing uniformly concave or convex 0.02:500. Therefore, the irregularities for the seating surface to be seated into are of what is caused by the finer profile element width of waviness and roughness on joint surfaces, and clause 5.2 of EN 13555 especially defines what for the seating surface to be seated into to be the irregularities caused by the surface roughness.

The roughness produced by modern common turning and boring methods can not exceed $R_a$ 1.6 μm (see FIG. B1 of ASME B46.1), and hence in order to simplify and unify a variety of tight joints of two opposing surfaces, such as flats to flats, conical surfaces to cones or spheres, spherical surfaces to spheres or cones, etc., the invention especially proposes a sealing joint of two opposing faces disposed at port ends or port shoulders of pressure vessels, pipes or tubes, or pipe or tube fittings to be jointed for holding or conveying fluid medium or power, comprising an opposing face (called a toothed surface) with one or more microsawtooth rings used as seating circles, and the other full plain opposing fate (called a plain surface) used as a seated surface, wherein the crest of the microsawtooth ring is a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 (corresponding to the ratio of the width $X_s$ to the height $Z_t$ of profile elements between the surface roughness with wider profile elements and the surface waviness with narrower profile elements) to provide for the toothed surface fastened tight on the plain surface a microcosmic line contact followed by a surface contact protecting the line contact thereon from disappearing. The sealing microsawtooth ring, having a cutting edge used for providing a line contact whose contact area is approximate to zero and whose contact stress is approximate to infinity, can deform to be seated into the irregularities on the plain surface to make the sealing joint on being pressed thereon by a small jointing pressure (however small it is), and, having an edge-following surface used for protecting the cutting edge from being excessively pressed to get blunt or disappeared on being elastically pressed a little, can therefore always provide an effective line contact for the sealing joint. These microsawtooth rings can be either successively or interruptedly disposed on the toothed surface. Their number does not matter and their orientation can be identical or contrary, but the tooth height $Z_t$ determines the deforming measure of the line contact, and the ratio of the tooth pitch $X_s$ to the tooth height $Z_t$ does the velocity at which the line contact is followed by the surface contact or the extent to which the line contact is provided and protected. In a certain seating surface, the smaller the ratio of the tooth pitch $X_s$ to the tooth height $Z_t$ the more the number of the bearing teeth, the slower the velocity at which each line is followed by a surface, and vice versa; using a different number of teeth in a certain seating surface can result in a different velocity for each single tooth, but their total velocity or their total seating effect may not change much or a seal design of more teeth may have the same sealing effect as the one of less teeth to some extent. If the velocity is different at which a line is followed by a surface, the faster the velocity, the larger the seating contact area, the smaller the seating contact stress, and the more decreased the sealing performance, and vice versa. If worn, the more worn the microsawtooth ring, the smoother the joint surface becomes, and the more beneficial to the tight joint.

In order to add an extra sealing reliability and safety sensation to microsawtooth ring joints, the invention especially proposes a sealing joint of two opposing faces disposed at port ends or port shoulders of pressure vessels, pipes or tubes, or pipe or tube fittings to be jointed for holding or conveying fluid medium or power, comprising an opposing face (called a toothed surface) with one or more microsawtooth rings used as seating circles, the other full plain opposing face (called a plain surface) used as a seated surface, and a gland seal with the gasket groove in the toothed surface or in the plain surface or in the two opposing surfaces and located at the inner or the outer of or between the microsawtooth rings, wherein the crest of the microsawtooth ring is a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 to provide for the toothed surface fastened tight on the plain surface a microcosmic line contact followed by a surface contact protecting the line contact thereon from disappearing. The volume and the section of gaskets shall match with those of grooves to provide a secondary seal for the joint.

Similarly, in order to add an extra sealing reliability and safety sensation to microsawtooth ring joints, the invention especially also proposes a sealing joint of two opposing faces disposed at port ends or port shoulders of pressure vessels, pipes or tubes, or pipe or tube fittings to be jointed for holding or conveying fluid medium or power, comprising an opposing face with a centrally raising flat and the other opposing face with a centrally recessing flat to form two opposing flats and an annular groove used as a gland seal when either the two opposing faces or the two opposing flats are jointed to be a pair of jointing opposing surfaces comprising an opposing surface (called a toothed surface) with one or more microsawtooth rings used as seating circles and the other full plain opposing surface (called a plain surface) used as a seated surface, wherein the crest of the microsawtooth ring is a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 to provide for the toothed surface fastened tight on the plain surface a microcosmic line contact followed by a surface contact protecting the line contact thereon from disappearing. The volume and the section of gaskets shall match with those of grooves to provide a secondary seal for the joint.

A typical example for sealing joints of parallel flats is a sealing joint of two opposing flange faces disposed at port ends of pressure vessels, pipes or tubes, or pipe or tube fittings to be jointed for holding or conveying fluid medium or power; either comprising an opposing flange face (called a toothed surface) with one peripheral edge or one macrosawtooth ring used as a fastening support to form a centrally raising surface with one or more microsawtooth rings used as seating circles, and the other full plain opposing flange face (called a plain surface) used as a seated surface, wherein the macrosawtooth ring edge and the microsawtooth ring edge are machined in one plane, the crests of the macrosawtooth ring and the microsawtooth ring are a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 to provide for the toothed surface fastened tight on the plain surface a circumferentially uniform microcosmic line contact followed by a surface contact protecting the line contact thereon from disappearing; or comprising an opposing flange face (called a toothed surface) with one peripheral edge or one macrosawtooth ring used as a fastening support to form a centrally raising surface with a gasket groove or recess used as a gland seal, and the other full plain opposing flange face (called a plain surface) used as a seated surface, wherein the macrosawtooth ring edge and the raising surface of the toothed surface are machined in one plane and the crest of the macrosawtooth ring is a cutting edge whose corner or whose crest angle is about 90°~120° to provide a circumferentially uniform jointing contact for the raising surface fastened tight on the plain surface.

A typical example for closing joints of parallel flats is a closing joint of parallel gate valves which include two seat rings mounted in the valve body and a gate slab or disc slidable therebetween to form a fluid controlling passage or to provide a fully open position when the gate is slid to where a opening portion of the gate slab is aligned with the valve passage or the gate disc is fully off the valve passage and a fully closed position when a blind portion of the gate slab or the gate disc is aligned with the valve passage, comprising a jointing end surface (called a toothed surface) per the seat ring and two parallel jointing surfaces (called plain surfaces) of the gate slab or disc used to form two identical closing joints, one being downstream and the other being upstream, which can either uni-directionally downstream or upstream or bi-directionally downstream and upstream block the fluid flow when the gate slab or disc is in the fully closed position, wherein there is such one or more microsawtooth rings on each toothed surface pressed tight on each plain surface as to form a jointing microcosmic line contact followed by a surface contact protecting the line contact thereon from disappearing.

A typical example for closing joints of tapered surfaces is a closing joint of wedge gate valves which include two seat rings fixed or integral in the valve body and a wedge disc wedged in or out therebetween to form a fluid controlling passage or to provide a fully open position when the wedge disc is fully off the valve passage and a fully closed position when the wedge disc is wedged tight between the two seat rings, comprising a jointing end surface (called a toothed surface) per the seat ring and two V-shaped jointing surfaces (called plain surfaces) of the wedge disc used to form two identical closing joints, one being downstream and the other being upstream, which can bi-directionally downstream and upstream block the fluid flow when the wedge disc is in the fully closed position, wherein there is such one or more microsawtooth rings on each toothed surface wedged tight on each plain surface as to form a jointing microcosmic line contact followed by a surface contact protecting the line contact thereon from disappearing.

A typical example for closing joints of spheres to conical or spherical surfaces is a closing joint of ball valves which include two seat rings mounted in the valve body and a ball turnable therebetween to form a fluid controlling passage or to provide a fully open position when the ball is turned to where the central through opening of the ball is coaxial with the valve passage and a fully closed position when the ball is turned to where the central through opening of the ball is perpendicular to the valve passage, comprising a jointing conical surface (called a toothed surface) per the seat ring and the jointing sphere (called a plain surface) of the ball used to form two identical closing joints, one being downstream and the other being upstream, which can block the fluid flow when the ball is in the fully closed position either uni-directionally downstream (in floating ball valves) or upstream (in mounted ball valves) or bi-directionally downstream and upstream (in double block and bleed valves), wherein there is such two microsawtooth rings on each toothed surface pressed tight on the plain surface as to form a jointing microcosmic line contact followed by a surface contact protecting the line contact thereon from disappearing. These two microsawtooth rings are developed in the original conical surface of the toothed surface by undercutting out another cut of conical surfaces symmetrically arranged about the ball's center and parallel to the original conical surface and having a radial distance $Z_t$ away from the plain surface passing through the vertexes of the two microsawtooth rings, which means the height of the two microsawtooth rings is $Z_t$ relative to the plain surface; the crest of the microsawtooth ring is a cutting edge whose corner or whose crest angle is about 90°~120°, and the tooth height $Z_t$ of the microsawtooth ring is about 10~20 times the roughness $R_a$ of the seated surface or the plain surface to provide for the toothed surface fastened tight on the plain surface a microcosmic line contact followed by a surface contact protecting the line contact thereon from disappearing. Actually, the distance between the original and the undercut conical surfaces is visible or macroscopic, not the tooth height $Z_t$ of the microsawtooth ring that is the distance between the undercut conical surface and the jointing sphere.

It has been clear from the above-mentioned examples that the microsawtooth ring of the invention can be used in the tight joint of a variety of machined surfaces such as flats to flats, conical surfaces to cones or spheres, spherical surfaces to spheres or cones, etc. As a matter of fact, a tight joint of any machined surfaces can be made by microsawtooth rings whose tooth height is somewhat greater than the height of profile elements of waviness (caused by cut vibrations) and roughness (caused by cutting edges), as long as the height of form error profile waves caused by perpendicularity and parallelism between machine tool ways, spindles and alignment of the workpiece is smaller than the height of waviness and roughness profile waves within the raising jointing surface with microsawtooth rings. For example, any closing joint of globe valves, check valves, etc. and any sealing joint of two opposing faces of split valve bodies, between engine cylinders and their heads, etc., which are not enumerated above and do not relate to any perpendicularity between the jointing face and its fastening thread, can be made by microsawtooth rings; and so can be any sealing joint of two opposing faces relating to their perpendicularity to their fastening threads, as long as the face and its fastening thread are developed in one clamping operation.

Any sealing process is for a seating surface or material to be seated into irregularities of a seated surface of two joint surfaces, and hence the rougher the seated surface, the more difficult it is to make the sealing joint, or the smoother the seated surface, the easier it is to make the sealing joint. However, the tight joint relying on gaskets of the prior art has not allowed a seated surface to be too smooth, for the gasket will be blown out by pressure from between the too smooth seated surfaces when relaxed. Accordingly, ASME B16.5 specifies that flange facings shall be the one with a serrated concentric or serrated spiral finish having a resultant surface roughness from $R_a$ 3.2 μm to 6.3 μm average roughness. Such a turning and boring surface roughness is a machining finish at the beginning of industrialization, only equivalent to the preliminary working level of modern industries; the modern common turning and boring level is surface roughness $R_a$ 1.6 μm to $R_a$ 3.2 μm for interior surfaces, and $R_a$ 0.8 μm to $R_a$ 1.6 μm for exterior surfaces (see FIG. B1 of ASME B46.1); and hence it can be said that the sealing art of gaskets parallel to a rough machining means at the beginning of industrialization is so incompatible with the modern machining art as to prolong either the service life of rough cutting machines to be obsoleted with high energy consumption or the working time of sophisticated machines in rough cutting operations, which accompanies both the meaningless consuming of natural resources and the numerous trashing of used gaskets to pollute the environment because gaskets can not be reused. Therefore, it can be said that the sealing art using the microsawtooth ring of the invention is a major technical progress keeping pace with times because the microsawtooth ring can only be economically developed by modern numerically controlled technology.

ASME Boiler & Pressure Vessel Code—Section VIII—Division 1—Appendix 2 (hereafter called ASME Code) proposes two gasket factors m and y used to calculate loads of gasketed flanges and adopted by EN 13445; y is the minimum necessary seating stress on the gasket to provide a seal at atmospheric temperature and pressure or at no fluid pressure, determined by testing at a fluid pressure of 0.14 bars, and $m=(W-A_2P)/A_1P$ is a factor that provides an additional preload needed in the flange fasteners to maintain a compressive load on the gasket at a fluid pressure, where W is the total fastener force, $A_2$ is the inside area of the gasket (equivalent to the actuating area of fluid on the flange cover), $A_1$ is the seating area of the gasket, and P is the fluid pressure. Undoubtedly, the force $(W-A_2P)$ is what to be able to result in a sealing stress on the seating surface at a fluid pressure P, whereas the force $A_1P$ is what to be able to cause an unseating force on the seating surface of the gasket by leaking fluid at a fluid pressure P; i.e. the factor m, for any tight joint, is the ratio of the force capable of resulting in a sealing stress on the seating surface of the joint to the unseating force of leaking fluid on the seating surface of the joint, and for a self-energizing tight joint, the ratio of the self-energizing force of the joint to the unseating force of leaking fluid on the seating surface of the joint, as well as for a pressure-tight joint (non-self-energizing), the ratio of the sealing force created by fasteners to the unseating force of leaking fluid on the seating surface of the joint. Obviously, the magnitude of the factor m should have been no direct thing to do with the factor y, and the greater the value of m, the more reliable the tight joint. However, it seems that ASME Code has not yet found the implied seal-designing law because major values of m and y in the present release of ASME Code are still determined by the equation: $180 \cdot (2m-1)^2 = y$, but has found some problems of the equation because minor values of m and y in the present release have not been in accordance with the equation. As ASME Code does not relate the gasket factors m and y to the leak rate, the PVRC (Pressure Vessel Research Council) and EN 13555 respectively propose new gasket constants or parameters related to tightness or leak rate and substituted for the gasket factors m and y, thus the gasket design becoming more complicated. However, the new PVRC's test method has been advanced to ASTM WK 10193-2006 but has not come into force for decades, and EN 13445 adopting the gasket factors m and y has not yet be superseded by EN 13555 coming into force in 2004. It seems that these newly specified constants or parameters may still have something wrong.

The gasket factors m and y ASME Code are based on looking at if a joint is leaky or not; the gasket constants in PVRC's test method, based on quantitative looking at the tightness of a joint for each internal pressure; and the gasket parameters in EN 13555, based on quantitative looking at the leak rate of a joint for a given internal pressure. According to ASME Code's concept, the minimum necessary seating stress of a gasket is a function of the gasket material strength and the seated surface texture, being a factor having nothing to do with the fluid pressure and the seating area for a given material and a given seated surface. According to PVRC's and EN's concepts, the minimum necessary seating stress of a gasket is related to the fluid pressure in addition to the gasket material strength and the seated surface texture, because the leak rate is related to leaking microchannels in the material bulk and will increase with the fluid pressure. Namely, the minimum necessary seating stress of a gasket is the force per unit seating area of the gasket, which is a parameter not related to the magnitude of the seating area, for a given material and a given seated surface, according to either the ASME Code's concept or the PVRC's and EN's concept. However, the minimum necessary seating stress for closing joints in some Chinese practical manuals for valve designs is related to no leak rate but to both fluid pressures and seating areas, which is not in accordance with either the ASME Code's concept or the PVRC's and EN's concept.

Each technical solution of the invention is based on correcting or improving and extending ASME Code's original concept for the gasketed flanges:

The invention defines the fixed tight joint of flanges fastened by threads or bolts as a fixed static tight joint, and does the movable closing joint of valves as a movable static tight joint. Thus the gasket factors m and y used for designing a tight joint of flanges in ASME Code are refined and extendedly used for designing a closing joint of valves. As a matter of fact, the extension is scientific because the difference between the two static tight joints is only their jointing frequency.

The invention extendedly defines the implied scientific meaning of ASME Code's gasket factor m as an explicit sealing maintenance factor or disturbance resistance index m (equal to the force capable of resulting in a sealing stress on the seating surface divided by the unseating force of leaking fluid on the seating surface) of a tight joint, and regards the seating surface as an upset impulse amplifier, thus proposing using the factor m to survey and design each tight joint in the light of ensuring it a higher value of m and thus a higher sealing reliability. In fact, any seating surface of tight joints is a real upset impulse amplifier and may output an unseating force not exceeding "seating area×fluid pressure" only with or under an upset impulse disturbance because the fluid will speedily seep into the seating surface in such a way from a partial to the whole surface as to cause a greater and greater unseating force finally up to the maximum of "seating area× fluid pressure" only when a tight joint is disturbed to an extent causing an enough decrease of seating stress, and of course, the greater the ratio of the force capable of resulting in a sealing stress on the seating surface to the unseating force of leaking fluid on the seating surface of the joint, or the greater the value of m of a tight joint, the higher the sealing reliability of the joint and the lower the leak rate of the joint. Therefore, it is undoubted that the sealing maintenance factor or disturbance resistance index m newly defined by the invention accords with the objective reality and reveals an universal law of tight joints; as to a self-energizing tight joint, its sealing and unseating forces are both created by a fluid pressure and hence undoubtedly the value of its m equals its fluid's sealing actuation area divided by its fluid's unseating actuation area; and as to a pressure-tight joint, its sealing force on the seating surface is created by fasteners and hence obviously its value of m equals its fastener-created sealing force divided by its fluid-caused unseating force on the seating surface.

The invention, based on the ASME Code's implication that a lower minimum necessary seating stress will be more desirable for tight joints, proposes a microsawtooth ring disposed on the jointing surface and used to provide for a tight joint a line contact followed by a surface contact protecting the line contact thereon from being crushed in reassemblies, thus making the tight joint at first have a line contact with its seating area approximate to zero or have a real seating stress satisfying its initial seating and approximate to infinity under a small fastening force, and then have a surface contact with such a small minimum necessary seating stress as to be virtually ignorable for load calculations and that the designing of tight joints only needs to consider a sealing maintenance factor m equivalent to the safety factor n to be considered when designing a general mechanical device.

As the sealing maintenance factor m of a self-energizing tight joint equals its fluid's sealing actuation area divided by its fluid's unseating actuation area, it can be said that its factor m is its inherent parameter, only related to its magnitudes of two fluid's actuation areas but not related to its material strength and its seated surface texture or not related to its minimum necessary seating stress y at atmospheric temperature and pressure, and its magnitude of m can be changed by changing its design and size, or not a fixed value of zero specified in ASME Code. For example, the value of the sealing maintenance factor m of an O-ring seal is not zero and changeable with its gland design or can be changed by changing its gland dimensions or by changing its ratio of two fluid's sealing and unseating actuation areas to obtain an adequate sealing reliability. As to the ball valve seats of patent CN 200810172828.X, whatever they are made of, the value of the sealing maintenance factor m of the ball valve seat in FIG. 7a is changeable with its design, where the closing joint is made by having the ball 03 self-floated on the valve seat 02; the value of the factor m of the ball valve seat in FIG. 10 is equal to one, where the closing joint is made by having the valve seat 02a and 02b self-floated on the ball 03; and the value of the factor m of the ball valve seat in FIG. 11 is equal to 1.41, where the closing joint is made by having the valve seat 02a and 02c self-floated on the ball 03.

As the sealing maintenance factor m of a pressure-tight joint equals its fastener-created sealing force divided by its fluid-caused unseating force on its seating surface, it can be said that its factor m is only related to its magnitudes of the fastening force resulting in a sealing effect and the unseating force caused by leaking fluid, but not related to its material strength and its seated surface texture, or not related to its minimum necessary seating stress y at atmospheric temperature and pressure, and its magnitudes of m can be changed within the material's allowable strength by changing its design and size to obtain an adequate sealing reliability. However, ASME Code incorrectly relates the gasket factor m to the gasket factor y by an equation of $180-(2m-1)^2=y$.

As a microsawtooth ring joint always begins with a line contact having an initial seating area more approximate to zero or having an initial seating edge sharper to be more easily seated into the irregularities when made by a harder material, and having a quality easier to be seated into the irregularities when made by a softer material, it can be said that any tight joint made by an adequate microsawtooth ring, however hard or soft its material is, will only need such a small minimum necessary seating load as to be ignorable for load calculations. Besides, the pre-fastening force not resulting in any sealing stress at ultimate working pressures, such as at a test pressure equal to four times the rating pressure, can provide an initial seating stress far greater than the needed at atmosphere temperature and pressure, and hence it can be imagined that any tight joint made by an adequate microsawtooth ring only needs a share and also can be easily provided with the share of additional forces required to maintain and enhance the small to be ignorable initial seating load and equal to m times its fluid's unseating actuation force; moreover the greater the value of its factor m, the higher its sealing reliability and the lower its leak rate. When the joint's factor m of a tight joint is equal to one, the joint's seating actuation force equals the joint's unseating actuation force, and so the tight joint will get into a leaky or leak-free critical state; i.e. any tight joint shall have a sealing maintenance factor m with its value more than one and can be in a stable leakfree state as the value is slightly more than one. However, in the light of ASME Code's incorrect concept, the critical value of the factor m of a tight joint that gets leaky or leak-free seems 0~6.5 and changes with its material and surface texture.

From the above-mentioned, it can be seen that the "joint's sealing maintenance factor or disturbance resistance index m (=joint's sealing actuation force divided by joint's unseating actuation force)" defined in the invention has been mostly different in concepts and applications from the ASME Code's gasket factor m, although refined from the ASME Code's. It might have been very easy for some persons skilled in the art to make a careful study of ASME Code's gasket factors and to be able to find that the gasket factor m has no direct thing to do with the gasket factor y, but no one has not been confined to ASME Code and has reached the great seal-designing law implied in the ASME Code's gasket factors m and y.

Therefore, the invention is a dig of and a breakthrough in the prior gasket factor's concept in ASME Code, and the breakthrough originates at the time when it is fully understood that the joint's minimum necessary seating stress y with a small to be ignorable value is the necessary and sufficient condition for the concept or the equation of the joint's sealing maintenance factor m at a fluid pressure to be significant or tenable universally, although the magnitudes of the two factors have no direct thing to do with each other. In fact, only when lowering the joint's factor y to an ignorable level or only when using a seating unit whose minimum necessary seating stress y is enough small, can a safe initial tight joint be earlier fully ensured, a smaller sealing actuation force get more effective for the joint, the joint be called a tight joint, and there be a tight joint needed to be maintained or there exist a sealing maintenance factor in virtually significant or tenable for the tight joint. Thus it can be said that the invention is at first creating a microsawtooth ring used as the seating unit of a tight joint to make its factor y ignorable, and then using the microsawtooth ring and the concept of the joint's factor m to create some tight joints with excellent sealing performance and to achieve the object of the invention.

BRIEF DESCRIPTION OF DRAWINGS

All the microsawtooth rings in the drawings of the invention are showed in an exaggerated way, where $X_t$ stands for their tooth height, and $X_s$ for their tooth pitch.

What

DETAILED DESCRIPTION OF THE INVENTION

According to the invention, the tight joints of a variety of machined surfaces such as flats to flats, conical surfaces to cones or spheres, spherical surfaces to spheres or cones, etc. can be made by microsawtooth rings; in order to add an extra sealing reliability and safety sensation to microsawtooth ring joints, a gland seal can be added to the inner side or the outer side of or between the microsawtooth rings to provide for the joint a tight joint by microsawtooth rings and another tight joint by gland seals;: and the additional gland seals can be summarized as a curve leak type and a straight leak type, and provided with a non-self-energizing or self-energizing gasket.

Figure 1:
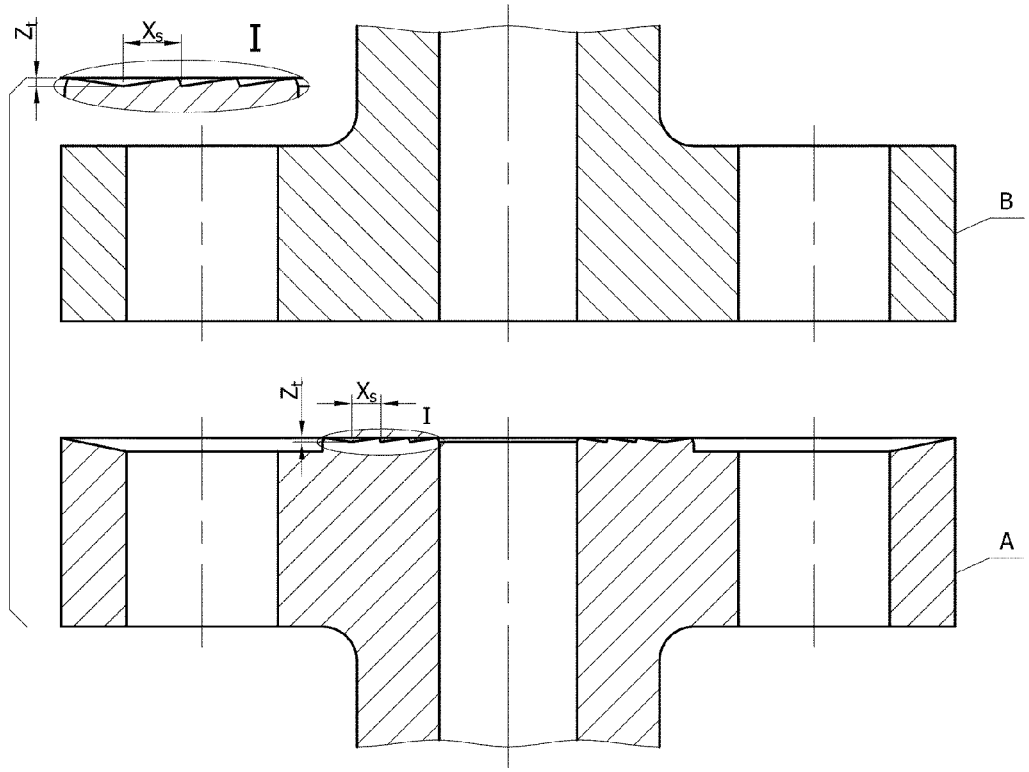
FIG. 1 shows a pair of bolted non-gasketed flanges in accordance with the invention, where flange A is the flange with a designed or toothed facing or with four sealing microsawtooth rings and one peripheral supporting macrosawtooth ring on its facing, and flange B is the flange with a full flat facing. When the two toothed and full flat facings are fastened tight together by bolts, the microsawtooth rings are used as seating circles to make a tight joint, and the macrosawtooth ring are used as a fastening support at first to ensure the tight joint a circumferentially uniform seating contact and then to prevent the flange rotation.

FIG. 1 shows a sealing joint of two flanges made by the microsawtooth ring in accordance with the invention, where flange A is the flange with a designed or toothed facing or with four sealing microsawtooth rings and one peripheral supporting macrosawtooth ring on its facing, and flange B is the flange with a full flat facing. The two toothed and full flat facings, fastened tight together by bolts, are provided with a tight joint made by the microsawtooth rings used as seating circles, and provided with a fastening support made by the macrosawtooth ring used at first to ensure the tight joint a circumferentially uniform seating contact and then to prevent the flange rotation.

Figure 2:
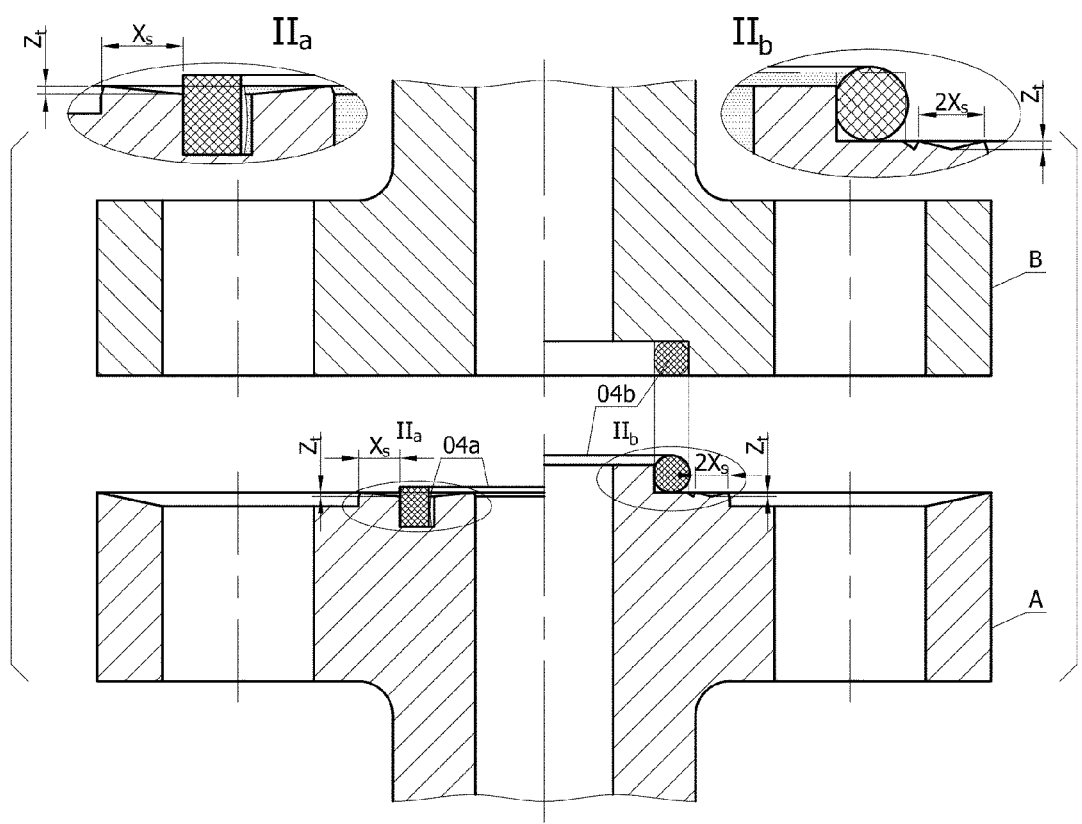
FIG. 2 shows two design pairs of bolted gasketed flanges in accordance with the invention, where the left and right sections each represent a design pair. The left section indicates a design pair of flanges with an integral groove of gland seals, where flange A is the flange with a designed or toothed facing or with two sealing microsawtooth rings, one peripheral supporting macrosawtooth ring and one gasket groove on its facing, and flange B is the flange with a full flat facing; when the two toothed and full flat facings are fastened tight together by bolts, the microsawtooth rings are used as seating circles to make a tight joint (the first tight joint), the gasket 04a in the groove is used to make a self-energizing tight joint (the second tight joint), and the macrosawtooth ring are used as a fastening support at first to ensure the two tight joints a circumferentially uniform seating contact and then to prevent the flange rotation. The right section indicates the other design pair of flanges with an assembled groove of gland seals, where flange A is a flange with a centrally raised facing whose centrally raising flat is full plain and whose peripherally lowering flat has two sealing microsawtooth rings and one peripheral supporting macrosawtooth ring, and flange B is a flange with a centrally recessed facing whose centrally recessing flat and whose peripherally raising flat are full plain; when the two stepped facings are fastened tight together by bolts, from the inner to the outer are in turn formed a pair of opposing flats without close contact to be free of joint's interference, an annular groove used to make a self-energizing tight joint (the second tight joint) by a round or rectangular gasket 04b therein, a pair of opposing flats with close contact used to make a tight joint (the first tight joint) by the microsawtooth rings, and a macrosawtooth ring support used to at first to ensure the two tight joints a circumferentially uniform seating contact and then to prevent the flange rotation.

FIG. 2 shows two sealing joints of flanges made by the microsawtooth ring and the additional gland seal in accordance with the invention; the left section indicates a sealing joint of flanges with an integral groove of gland seals, and the right section indicates the other sealing joint of flanges with an assembled groove of gland seals. The left flange A is the flange with a designed or toothed facing or with two sealing microsawtooth rings, one peripheral supporting macrosawtooth ring and one integral gasket groove on its facing, and the left flange B is the flange with a full flat facing; the two toothed and full flat facings, fastened tight together by bolts, are provided with a tight joint (the first tight joint) made by the microsawtooth rings used as seating circles, provided with another self-energizing tight joint (the second tight joint) made by the gasket 04a in the groove, and provided with a fastening support made by the macrosawtooth ring used at first to ensure the tight joint a circumferentially uniform seating contact and then to prevent the flange rotation. The right flange A is a flange with a centrally raised facing whose centrally raising flat is full plain and whose peripherally lowering flat has two sealing microsawtooth rings and one peripheral supporting macrosawtooth ring, and the right flange B is a flange with a centrally recessed facing whose centrally recessing flat and whose peripherally raising flat are full plain; the two stepped facings, fastened tight together by bolts, are from the inner to the outer in turn provided with a pair of opposing flats without close contact to be free of joint's interference, an annular groove used to make a self-energizing tight joint (the second tight joint) by a round or rectangular gasket 04b therein, a pair of opposing flats with close contact used to make a tight joint (the first tight joint) by the microsawtooth rings, and a macrosawtooth ring support used to at first to ensure the two tight joints a circumferentially uniform seating contact and then to prevent the flange rotation. The sealing joints of valve seat 02a and valve body 01 in FIGS. 4 (or 5) and 8 (or 9) are also the sealing joint made by the microsawtooth and the additional gland seal in FIG. 2.

As the peripheral supporting macrosawtooth ring in FIGS. 1 and 2 is of a high macroedge and can also be partially provided only near bolts if necessary, the macrosawtooth ring generally can have such a strength far lower than the sealing microsawtooth rings with a low microedge but be virtually of such a strong fastening support for every tightening operation in each torque-increased tightening round of cross-tightening sequences as not to influence the microsawtooth ring to be seated into irregularities and make a tight joint but also avoid an asymmetric load of bolts and a flange rotation of traditional joints.

The left gland seal in FIG. 2 is of a straight leak type, whose leaking path is along the jointing surface between gasket 04a and flange B; whereas the right gland seal in FIG. 2 is of a curve leak type, whose leaking path is at first along the jointing curve surface between gasket 04b and flange B. If crammed tight in its groove after the joint is made, the gasket will have no fluid actuation area or have no self-energizing ability to enhance the tight joint, whose seating load or stress can only be pre-provided by the fasteners during assembling. If not crammed to the pressurized wall of its groove after the joint is made, the gasket will have fluid actuation area or have self-energizing ability to enhance the tight joint, whose seating stress will increase with the fluid pressure. The gaskets 04a and 04b shown in FIG. 2 is deployed to make self-energizing tight joints.

Figure 3A:
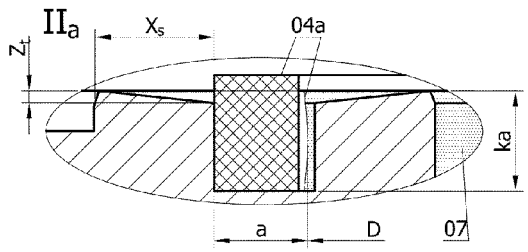
FIGS. 3a~3c are the enlarged views of local area $II_a$ in FIG. 2. The rectangular gasket 04a in FIG. 3a, with a more height compression, will get bulged in the middle after installed, and in FIG. 3b, with a less height compression, will have no substantial deformation after installed.
Figure 3B:
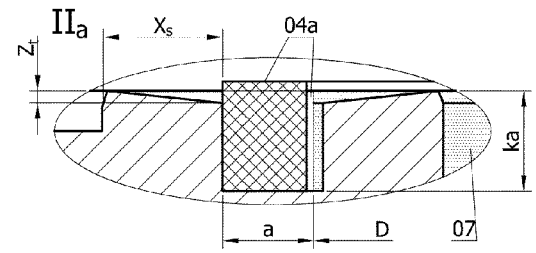
Figure 3C:
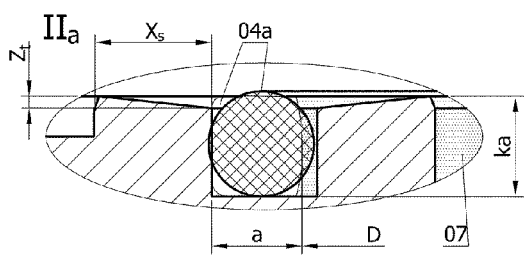

The original self-energizing gasket 04a in FIG. 2 can be either of a rectangular section shown in FIGS. 3a and 3b or of a round section shown in FIG. 3c, whose section and volume shall be helpful in having a close contact with the other sides except the high pressure side of its groove after the joint is made in order to enable the fluid 07 on it to create a sealing force; the gasket in FIG. 3a, with a more height compression, will get bulged in the middle after installed; whereas the gasket in FIG. 3b, with a less height compression, may be still nearly rectangular after installed.

As shown in FIGS. 3a~3c, the left self-energizing gasket 04a in FIG. 2 has a fluid's sealing actuation area equal to $\pi Dka$, a fluid's unseating actuation area equal to $\pi \cdot (D+a) \cdot a$, and a ratio of "fluid's sealing actuation area to fluid's unseating actuation area" equal to $k/(1+a/D)$; and therefore only when $k>(1+a/D)$, could it ensure a tight joint by a soft gasket with such an enough liquid behavior or with such a Poisson's ratio approximate to 0.5 as to fully change the pressure on its fluid's sealing actuation surface into the seating stress on its seating surface, and perhaps only when $k>2(1+a/D)$, by a hard gasket without such an enough liquid behavior or without such a Poisson's ratio approximate to 0.5 as to at most half change the pressure on its fluid's sealing actuation surface into the seating stress on it seating surface. If of a round section as shown in FIG. 3c, the left self-energizing gasket 04a in FIG. 2 shall still have $k<4/\pi$ because it will have a section diameter equal to or smaller than its groove depth so as to have no height squeeze or no initial seating contact or no self-energizing ability when $k \geq 4/\pi$ (see patent CN 101551013A); i.e. the value of k for a round section of gasket 04a in FIG. 2 shall satisfy the inequality: $(1+a/D)<k<4/\pi$. Thus it can be seen that a rectangular gasket, when used for a straight leak type of self-energizing gland seals, only has a minimum limit of k and so is more easily designed to have a higher sealing reliability than a round gasket with two limits of k.

Figure 3D:
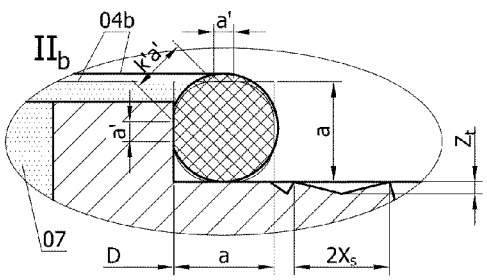
FIG. 3d is the enlarged view of local area $II_b$ in FIG. 2, where the gasket 04b is of a round section.

As shown in FIG. 3d, the right original self-energizing gasket 04b in FIG. 2 should have an adequate round section and a square groove in order to have a contact length a' and an avoidance or contactless chord length k'a' in the section between the gasket and the groove and to make $k'>\sqrt{2}$ after installed. When $k'>\sqrt{2}$, the sealing maintenance factor m at the four lengths a' of soft gaskets with an enough liquid behavior will be nearly more than $\sqrt{2}$, and at least at the two lengths a' close to the leaking exit of hard gaskets without an enough liquid behavior always more than 1. Thus it can be seen that the round gasket has an excellent sealing performance when used for a curve leak type of self-energizing gland seals.

Figure 4:
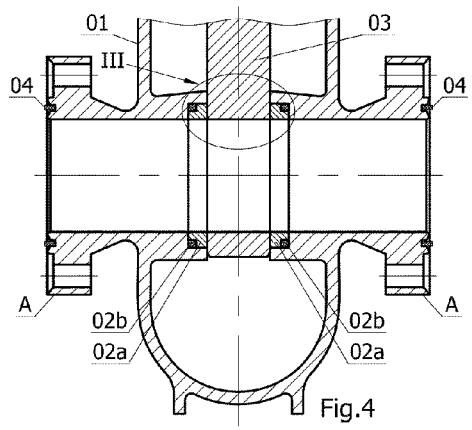
FIG. 4 shows a slab gate valve whose closing joint, as shown in FIG. 5 (the enlarged view of the local area III of FIG. 4), is made by the microsawtooth ring in accordance with the invention, and whose sealing joints for two flanged ends A and whose sealing joint of body A and bonnet B not shown as in FIG. 6 are the same as the sealing joint of flanges in the left section of FIG. 2.
Figure 5:
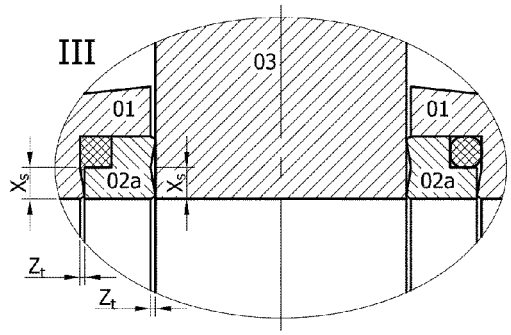

FIG. 4 shows a slab gate valve whose closing joint is made by the microsawtooth ring in accordance with the invention, inducting two seat rings 02a mounted in the valve body 01 and a rectangular gate slab 03 slid up and down therebetween by operating a valve stem to control the fluid flow. As shown in FIg. 5 (the enlarged view of the local area III of FIG. 4), there is respectively a microsawtooth ring concentric with the fluid passage on each jointing end surface between the seat rings 02a and the gate slab 03 and on each jointing end surface between the valve body 01 and the seat ring 02a, and there is a gasket 02b between the valve body 01 and the seat ring 02a. When slid to where its opening and the fluid passage are fully staggered, the gate slab 03 will be in turn pressed by the fluid tight on the downstream seat ring 02a, the gasket 02b and the valve body 01 to make a tight joint on the downstream seat ring by the microsawtooth ring and to make a dually tight joint between the seat ring 02a and the valve body 01 by the gasket and the microsawtooth ring. The two jointing surfaces of the gate slab 03 can be either a full flat or an annular spot facing. The gaskets 02b can be either of the left pressure-tight rectangular section or of the right self-energizing round section. The tight joint of the valve bonnet and body not shown in FIG. 4 can be made by the microsawtooth ring and the additional gland seal as shown in FIG. 6.

Figure 6:
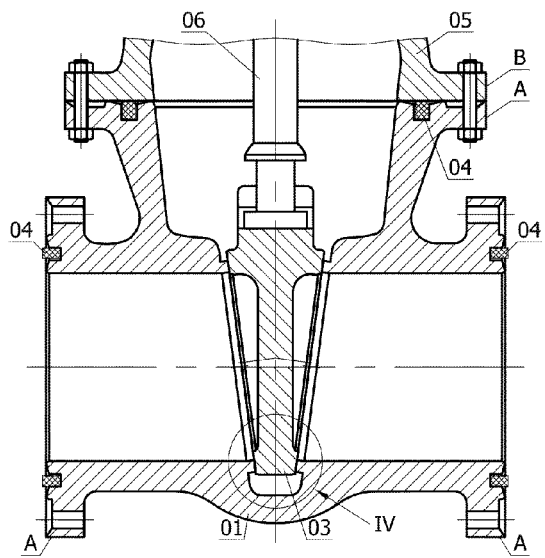
FIG. 6 shows a wedge gate valve whose closing joint, as shown in FIG. 7 (the enlarged view of the local area IV), is made by the microsawtooth ring in accordance with the invention, and whose sealing joints for two flanged ends A and whose sealing joint of body A and bonnet B are the same as the sealing joint of flanges in the left section of FIG. 2.
Figure 7:
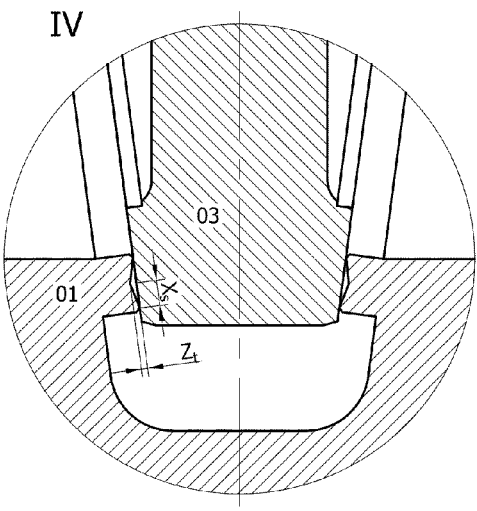

FIG. 6 shows a wedge gate valve whose closing joint is made by the microsawtooth ring in accordance with the invention, including two seat rings integral in the valve body 01 and a wedge disc 03 wedged in and out therebetween by operating a valve stem 06 to control the fluid flow. As shown in FIG. 7 (the enlarged view of the local area IV of FIG. 6), there is a microsawtooth ring nearly concentric with the fluid passage on each jointing end surface of the seat rings and the wedge disc 03. When wedged tight between the two seat rings, the wedge disc 03 may be further pressed by the fluid tight on the downstream seat ring to maintain a tight joint thereon by the microsawtooth ring. The two jointing surfaces of the wedge disc 03 can be either a full flat or an annular spot facing. The seat rings can be integrated tight in the valve body 01 by embedding. The tight joint of the valve bonnet 05 and the valve body 01 can also be made by the microsawtooth ring and the additional gland seal as shown in FIG. 6, where the valve body end A and the bonnet end B are respectively the same in designs as the left flanges A and B of FIG. 2.

Figure 8:
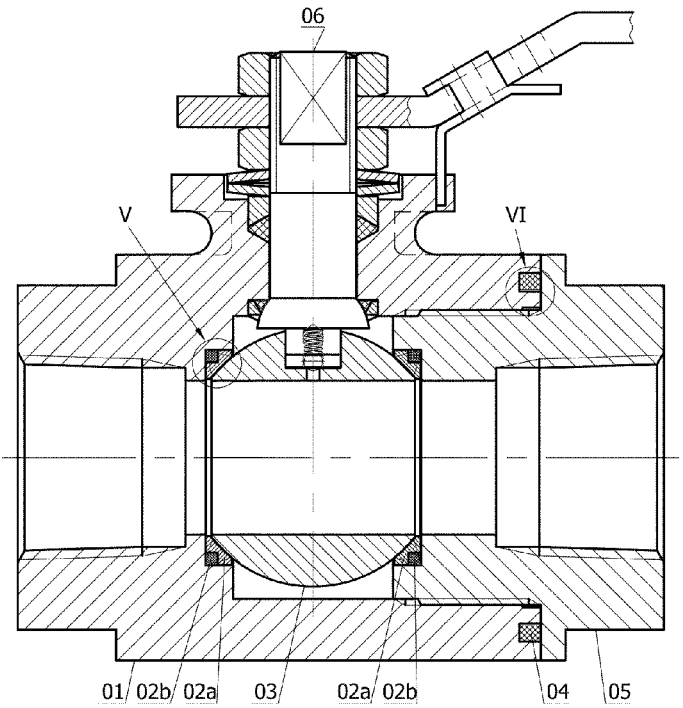
FIG. 8 shows a floating ball valve whose closing joint, as shown in FIG. 9 (the enlarged view of the local area V), is made by the microsawtooth ring in accordance with the invention, and whose sealing joint of split bodies, as shown in FIG. 10 (the enlarged view of the local area VI), is the same as the sealing joint of flanges in the left section of FIG. 2.
Figure 9:
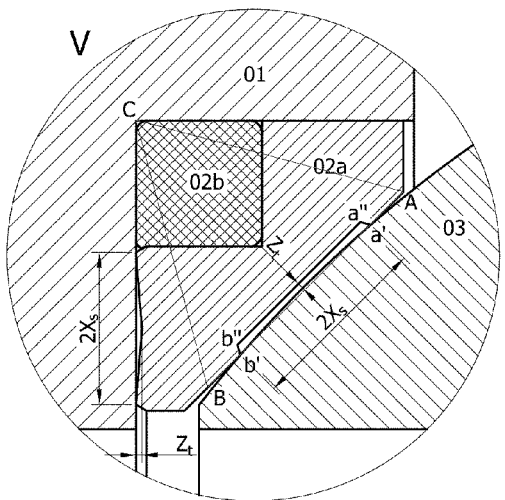
Figure 10:
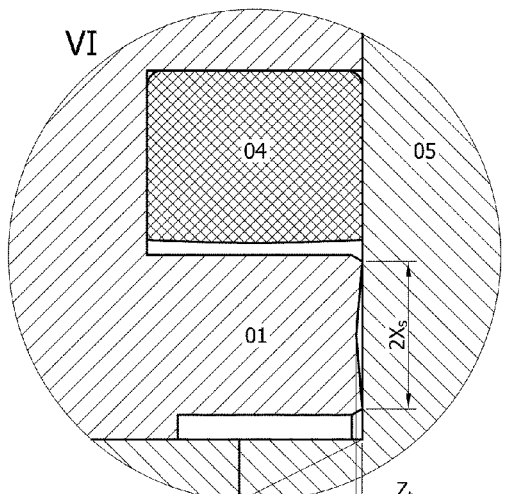

FIG. 8 shows a floating ball valve whose closing joint is made by the microsawtooth ring in accordance with the invention, including two seat rings 02a mounted in the valve body 01 and an on-off ball 03 turned therebetween by operating a valve stem 06 to control the fluid flow. As shown in FIG. 9 (the enlarged view of the local area V of FIG. 8), there are respectively two microsawtooth rings on each jointing conical surface AB of the seat rings 02a and the ball 03 and on each jointing end surface between the valve body 01 and the seat ring 02a, and there is a gasket 02b between the valve body 01 and the seat ring 02a. When turned to where its central through opening is perpendicular to the fluid passage, the ball 03 will be in turn pressed by the fluid tight on the downstream seat ring 02a, the gasket 02b and the valve body 01 to make a tight joint on the downstream seat ring by the microsawtooth rings a' and b' and to make a dually tight joint between the seat ring 02a and the valve body 01 by the gasket 02b and the microsawtooth rings either on the seat ring 02a or on the valve body 01. The microsawtooth rings a' and b' are developed on the original conical surface AB by undercutting out another cut of conical surfaces a'''b'' symmetrically arranged about the ball's center and parallel to the original conical surface AB and having a radial distance $Z_t$ away from the ball's surface passing through the vertexes of the two microsawtooth rings a' and b', which means the height of the two microsawtooth rings a' and b' is only $Z_t$ relative to the jointing ball's surface; the crest of the microsawtooth ring a' and b' is a cutting edge whose corner or whose crest angle is about 90°~120°, and the tooth height $Z_t$ of the microsawtooth rings a' and b' is about 10~20 times the roughness $R_a$ of the ball's surface to provide for the conical surface AB fastened tight on the ball's surface a microcosmic line contact followed by a surface contact protecting the line contact thereon from disappearing. Actually, the distance between the original conical surface AB and the undercut conical surface a"b" is visible or macroscopic, not the tooth height $Z_t$ of the microsawtooth rings a' and b' relative to its jointing ball's surface, the microcosmic $Z_t$ being the distance between the undercut conical surface a"b" and the jointing ball's surface. As shown in FIG. 10 (the enlarged view of the local area VI of FIG. 8), the tight joint of the valve cover 05 and the valve body 01 can also be made by the microsawtooth ring and the additional gland seal (04), where the valve body end and the valve cover are respectively the same in sealing designs as the left flanges A and B of FIG. 2, merely different in fastening ways that here is directly by threads and there is by bolts, and can be of a tight joint of flanges in a broad sense.

All in all, the sealing joint of bolted non-gasketed flanges in FIG. 1, the sealing joint of bolted gasketed flanges in FIG. 2, the closing joint of slab gate valves in FIG. 4, and the sealing joints for the flanged ends A and between the valve body 01 and the valve bonnet or cover 05 in FIGS. 4, 6 and 8 are some embodiments of the tight joint of two flat surfaces made by microsawtooth rings; the closing joint of wedge gate valves in FIG. 6 can be regarded as an embodiment of the tight joint of two tapers or cones made by microsawtooth rings; and the closing joint of floating ball valves in FIG. 8 can be regarded as an embodiment of the tight joint of two spherical to conical surfaces made by microsawtooth rings. As shown in the local enlarged views, the crest of all the microsawtooth rings is a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements). These microsawtooth rings can be either successively or interruptedly disposed on the seating surface. Their number does not matter and their orientation can be identical or contrary, but the tooth height $Z_t$ determines the deforming measure of the line contact, and the ratio of the tooth pitch $X_s$ to the tooth height $Z_t$ does the velocity at which the line contact is followed by the surface contact or the extent to which the line contact is provided and protected. In a certain seating surface, the smaller the ratio of the tooth pitch $X_s$ to the tooth height $Z_t$, the more the number of the bearing teeth, the slower the velocity at which each line is followed by a surface, and vice versa; using a different number of teeth in a certain seating surface can result in a different velocity for each single tooth, but their total velocity or their total seating effect may not change much and may still ensure the tight joint a microcosmic line contact followed by a surface contact. The line contact, having a seating area approximate to zero and so a seating stress approximate to infinity, can always deform to be seated into the irregularities on the seated surface to make a sealing joint on being pressed thereon by a small jointing pressure (however small it is), and, followed by the whole seating surface protecting it from being excessively pressed to get blunt or disappeared on being elastically pressed a little, can also always keep it effective for ever for the sealing joint. If the velocity is different at which a line is followed by a surface, the faster the velocity, the larger the seating area, the smaller the seating stress, and the more decreased the sealing performance, and vice versa.

Figures 11A, 11B:
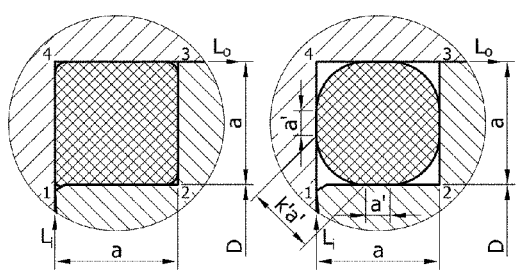
FIGS. 11 and 12 show are four typical gland seals used in the invention. The gasket grant (1-2-3-4) of FIG. 11 is of a square section, and the path leaking from $L_i \rightarrow L_o$ is at first along route 1-4-3 or of a curve leak type. The gasket groove (1-2-3-4) of FIG. 12 is of a rectangular section, and the path leaking from $L_i \rightarrow L_o$ is along route 1-2 or of a straight leak type. The gaskets of FIGS. 11a and 12a are crammed tight in their grooves and have no fluid actuation area and no self-energizing ability, whereas the gaskets of FIGS. 11b and 12b are not crammed to the pressurized wall of their grooves and have some fluid actuation area and some self-energizing ability.
Figures 12A, 12B:
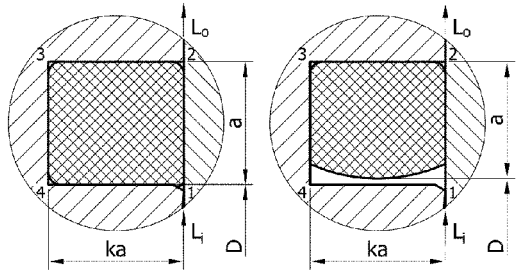

What FIGS. 11 and 12 show are four typical gland seals used in the invention. The gland seal shown in FIG. 11 is of a curve leak type, whose gasket groove is of a square section 1-2-3-4 and whose path leaking from $L_i \rightarrow L_o$ is at first along route 1-4-3 and then along route 1-2-3 because the areas and the stresses of surfaces 1-4 and 2-3 are equal to each other, and the area and the stress of surface 3-4, respectively greater and smaller than surface 1-2. The gland seal shown in FIG. 12 is of a straight leak type, whose gasket groove is of a rectangular section 1-2-3-4 and whose path leaking from $L_i \rightarrow L_o$ is along route 1-2. However, the gaskets of FIGS. 11a and 12a are crammed tight in their grooves and have no fluid actuation area and no self-energizing ability, whereas the gaskets of FIGS. 11b and 12b are not crammed to the pressurized wall of their grooves and have some fluid actuation area and some self-energizing ability. Actually, these four gland seals are also the typical designs of the general gland seals. It is adequate to select a self-energizing tight joint for use with a soft gasket, such as a rubber gasket, having such an enough liquid behavior or having such a Poisson's ratio approximate to 0.5 as to fully change the pressure on its fluid's sealing actuation surface into the seating stress on its seating surface, and having such an incompressibility in volume and such a unrecoverable compression set in dimensions as to make use of them to enhance the tight joint; to select a pressure-tight joint for use with a flexible graphite gasket having such a compressible volume as to harmoniously pre-eliminate the leaking microchannels in each directional material bulk by preloading; and to respectively select such a rectangular gasket as shown in FIG. 12b and such a round gasket as shown in FIG. 11b for use with a straight leak type and a curve leak type of self-energizing gland seals as to have a higher value of sealing maintenance factor or disturbance resistance index m (see the above descriptions on the designs of FIG. 3).

The assembled groove type of gland seals used with a microsawtooth ring joint can be either of a pressure-tight seal shown in FIG. 11a or of a self-energizing seal shown in FIG. 11b, and the integral groove type of gland seals used with a microsawtooth ring joint can be either of a pressure-tight seal shown in FIG. 12a or of a self-energizing seal shown in FIG. 12b.

The invention claimed is:

1. A sealing joint of two opposing faces disposed at port ends or port shoulders of pressure vessels, pipes or tubes, or pipe or tube fittings to be jointed for holding or conveying fluid medium or power, comprising an opposing face (called a toothed surface) with one or more microsawtooth rings used as seating circles, and the other full plain opposing face (called a plain surface) used as a seated surface, wherein the crest of the microsawtooth ring is a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 to provide for the toothed surface fastened tight on the plain surface a microcosmic line contact followed by a surface contact protecting the line contact thereon from disappearing.

2. A sealing joint of two opposing faces disposed at port ends or port shoulders of pressure vessels, pipes or tubes, or pipe or tube fittings to be jointed for holding or conveying fluid medium or power, comprising an opposing face (called a toothed surface) with one or more microsawtooth rings used as seating circles, the other full plain opposing face (called a plain surface) used as a seated surface, and a gland seal with the gasket groove in the toothed surface or in the plain surface or in the two opposing surfaces and located at the inner or the outer of or between the microsawtooth rings, wherein the crest of the microsawtooth ring is a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 to provide for the toothed surface fastened tight on the plain surface a microcosmic line contact followed by a surface contact protecting the line contact thereon from disappearing.

3. A sealing joint of two opposing faces disposed at port ends or port shoulders of pressure vessels, pipes or tubes, or pipe or tube fittings to be jointed for holding or conveying fluid medium or power, comprising an opposing face with a centrally raising flat and the other opposing face with a centrally recessing flat to form two opposing flats and an annular groove used as a gland seal when either the two opposing faces or the two opposing flats are jointed to be a pair of jointing opposing surfaces comprising an opposing surface (called a toothed surface) with one or more microsawtooth rings used as seating circles and the other full plain opposing surface (called a plain surface) used as a seated surface, wherein the crest of the microsawtooth ring is a cutting edge whose corner or whose crest angle is about 90°~120°, the tooth height $Z_t$ of the microsawtooth ring is about 10~20 times the roughness Ra of the seated surface or the plain surface, and the ratio of the tooth pitch $X_s$ to the tooth height $Z_t$ of the microsawtooth ring equals 20~500 to provide for the toothed surface fastened tight on the plain surface a microcosmic line contact followed by a surface contact protecting the line contact thereon from disappearing.

4. A sealing joint of two opposing flange faces disposed at port ends of pressure vessels, pipes or tubes, or pipe or tube fittings to be jointed for holding or conveying fluid medium or power, either comprising an opposing flange face (called a toothed surface) with one peripheral edge or one macrosawtooth ring used as a fastening support to form a centrally raising surface with one or more microsawtooth rings used as seating circles, and the other full plain opposing flange face (called a plain surface) used as a seated surface, wherein the macrosawtooth ring edge and the microsawtooth ring edge are machined in one plane, the crests of the macrosawtooth ring and the microsawtooth ring are a cutting edge whose corner or whose crest angle is about 90°~120°, the tooth height $Z_t$ of the microsawtooth ring is about 10~20 times the roughness $R_a$ of the seated surface or the plain surface, and the ratio of the tooth pitch $X_s$ to the tooth height $Z_t$ of the microsawtooth ring equals 20~500 to provide for the toothed surface fastened tight on the plain surface a circumferentially uniform microcosmic line contact followed by a surface contact protecting the line contact thereon from disappearing; or comprising an opposing flange face (called a toothed surface) with one peripheral edge or one macrosawtooth ring used as a fastening support to form a centrally raising surface with a gasket groove or recess used as a gland seal, and the other full plain opposing flange face (called a plain surface) used as a seated surface, wherein the macrosawtooth ring edge and the raising surface of the toothed surface are machined in one plane and the crest of the macrosawtooth ring is a cutting edge whose corner or whose crest angle is about 90°~120° to provide a circumferentially uniform jointing contact for the raising surface fastened tight on the plain surface.

* * * * *

UNITED STATES PATENT AND TRADEMARK OFFICE
CERTIFICATE OF CORRECTION

PATENT NO. : 8,714,599 B2
APPLICATION NO. : 13/142445
DATED : May 6, 2014
INVENTOR(S) : Changxiang Xu It is certified that error appears in the above-identified patent and that said Letters Patent is hereby corrected as shown below:

Title page, Item 73 Assignee should read: -- Zhejiang China Valve Co., Ltd., Zhejiang Province, China --

Signed and Sealed this
Ninth Day of August, 2016

Michelle K. Lee
*Director of the United States Patent and Trademark Office*